United States Patent
Klindworth et al.

(10) Patent No.: US 6,771,701 B1
(45) Date of Patent: Aug. 3, 2004

(54) ADAPTIVE FILTER DIVERGENCE CONTROL IN ECHO CANCELERS BY MEANS OF AMPLITUDE DISTRIBUTION EVALUATION WITH CONFIGURABLE HYSTERESIS

(75) Inventors: Andre Klindworth, San Jose, CA (US); Erik Hogl, Santa Clara, CA (US); Ulrich Fiedler, Santa Clara, CA (US)

(73) Assignee: Infineon Technologies North America Corporation, San Jose, CA (US)

( * ) Notice: Subject to any disclaimer, the term of this patent is extended or adjusted under 35 U.S.C. 154(b) by 0 days.

(21) Appl. No.: 09/476,012

(22) Filed: Dec. 29, 1999

Related U.S. Application Data

(60) Provisional application No. 60/133,725, filed on May 12, 1999.

(51) Int. Cl.[7] .................................................. H03H 7/40
(52) U.S. Cl. ...................... 375/232; 375/350; 370/290; 379/407; 379/411; 455/307; 455/308; 708/322
(58) Field of Search ................................ 375/230, 232, 375/231, 285, 346, 350; 370/269, 286, 287, 290, 291; 379/406, 407, 410, 411, 416, 417; 455/63, 296, 307, 308; 708/322

(56) References Cited

U.S. PATENT DOCUMENTS 6,430,162 B1 * 8/2002 Reese et al. ................ 370/286
6,516,050 B1 * 2/2003 Tasaki et al. .................. 379/3

* cited by examiner

Primary Examiner—Stephen Chin
Assistant Examiner—Dac V. Ha
(74) Attorney, Agent, or Firm—Fish & Richardson P.C.

(57) ABSTRACT

A configurable adaptive filter that is used for echo cancellation is disclosed, which includes a method of detecting a voice or no-voice signal. The presence of a voice or no-voice signal is determined by calculating a histogram of signal amplitude value over a period of time. If this histogram has more than a predefined number of samples that are above a threshold then the signal is classified as no-voice or periodic otherwise the signal is classified as a voice signal. A variable maximum amplitude limit and lower amplitude thresholds are disclosed to detect a voice or no-voice from the histogram signal faster than traditional methods utilized in echo cancelers. A configurable hysteresis time is used to ensure the signal register primarily contains voice signal when the filter coefficients of the echo canceler are allowed to adapt.

18 Claims, 12 Drawing Sheets

ADAPTIVE FILTER DIVERGENCE CONTROL IN ECHO CANCELERS BY MEANS OF AMPLITUDE DISTRIBUTION EVALUATION WITH CONFIGURABLE HYSTERESIS

RELATED APPLICATIONS

This application claims the benefit of U.S. Provisional Application No. 60/133,725, filed May 12, 1999.

FIELD OF THE INVENTION

The present invention relates in general to the telecommunications field and, in particular, to echo cancellation in telephone systems.

BACKGROUND OF THE INVENTION

Echo cancelers are commonly used in telephone systems to remove acoustical and electrical echoes that may occur due to reflections of the signal in the communication lines. Some causes of electrical echoes may be caused by hybrid circuit splits or imperfect terminations in subscriber loops. A hybrid circuit is a device that converts a four wire line into a two wire line at a private branch exchange (PBX). Acoustical echoes may occur in speaker phone systems due to poor isolation of the microphone used in the system. These electrical and acoustical echoes disturb the quality of the transmission over the system thereby affecting the quality of the conversation between users of the communication system.

To ensure high quality and pure data transmission, the ITU-T (International Telecommunications Union, Telecommunications Standardization Sector) suggests in their recommendation G.131 the use of echo cancelers. The use of echo cancelers is extremely desirable for data links having a total round trip transmission time of more than 50 milliseconds. Typically, users do not hear echoes when the round trip transmission time is less than 50 milliseconds.

Echo cancelers are commonly used in many different types of telephone systems. For example, they may be used in an asynchronous transfer mode network (ATM), a synchronous digital hierarchy (SDH) network, a plesiochronous digital hierarchy (PDH) network, an Internet protocol (IP) network, or mobile servicing switching centers (MSCs).

Many echo cancelers make use of adaptive linear filters to calculate an estimate of the echo that is introduced by the hybrid nearest the user. These adaptive filters are constantly adapting coefficients while a voice signal is detected in order to converge on a solution to remove the echo from the communication line. Fast and reliable convergence of the filter coefficients is crucial to the overall performance of the echo canceler. The adaptive linear filters used in echo cancelers today have difficulty in handling signal sequences that have a predominantly periodic characteristic. Often, the periodic signal characteristics are detected so late that the quality of echo canceling worsens due to an improper filter adaptation. Instead of the filter coefficients converging upon a solution, they diverge, resulting in poor echo canceling or even overcompensation of the signal. This divergence and overcompensation is worsened by the fact that present adaptive echo canceler systems begin adaptation of the filter coefficients too early and stop adaptation of the filter coefficients too late.

Adaptive filters used in echo cancelers typically use a fixed time frame register to detect predominantly sinusoidal signal characteristics. The adaptation of the filter coefficients is enabled or disabled depending solely on the current result of signal evaluation obtained during the fixed time frame. Typically, a Fourier transformation is conducted on the signal and the spectrum is evaluated to detect periodic signals.

FIG. 1 illustrates how a conventional adaptive echo canceler detects a voice signal or periodic signal. FIG. 1 displays a graph 120 of a periodic signal and a voice signal. A voice signal 102 is centered between two sinusoidal periodic signals 100. A sliding evaluation window, X-register 80, holds a portion of the signal shown in graph 120. The X register 80 holds a finite number of samples of the combined periodic and voice signals based on the size of the register. The X-register 80 is filled with new sample values as time is incremented. Once the X-register 80 is fill, the samples that were first loaded into the X-register 80 are discarded.

Below the graph 120 is a timing diagram indicating when the echo canceler detects the presence of a voice signal based on the contents of the X-register 80. At time t_1 a voice signal is detected. It can be seen, however, at this time t_1 the X-register 80, contains a portion of the periodic signal 100 along with a portion of the voice signal 102. This is generally undesirable since it may cause the canceler to diverge. From time t_1 to a time t_2 when the voice signal is no longer detected, the echo canceler in the prior art approaches would be allowed to adapt the filter coefficients. Instead of the filter coefficients converging, however, the filter coefficients may diverge from the correct solution because the X-register includes samples of the periodic signal.

As illustrated by the preceding example, the problems with traditional echo cancelers include divergence or poor convergence of the filter coefficients due to the fact that the adaptation of the filter coefficients is begun too early while a significant subset of the predominantly periodic signal value is still present in the sampling window and the detection of a predominantly periodic signal characteristic may take so long that the sinusoidal signal leads to bad echo canceler performance. Without a flexible adjustment it is difficult to adapt the echo canceling algorithm to the properties of the voice characteristics and/or the echo path, or to trade off between speed of convergence of the filter coefficients and filter protection. Finally, use of the Fourier transform requires extensive calculation.

Given these shortcomings, there is a need for an adaptive filter system that provides a fast and flexible detection of voice and periodical signals to allow the filter coefficients to converge quickly.

SUMMARY OF THE INVENTION

Briefly described, the present invention is an echo canceler that quickly detects the presence of periodic signals and is optimized for fast convergence of the filter coefficients. The present invention distinguishes between voice and periodic, or no-voice signals, by creating a histogram of the amplitude values of the signal that are currently held in a fixed time frame register. If a certain, configurable percentage of the sample values fall within the interval created by a lower amplitude limit and a maximum amplitude limit, a voice detection unit recognizes this as a no-voice signal. On the other hand, if a configurable percentage of sample values do not fall within this interval, the voice detection unit detects a voice signal. If a voice signal is detected, an additional amount of hysteresis time, is allowed to lapse until an adaptive linear filter is allowed to begin adapting filter coefficients.

In one embodiment of the invention, the histogram is formed from the signal received during a predetermined configurable evaluation time. This evaluation time is chosen short enough such that the histogram can react quickly to periodic signals, but large enough to avoid frequently halting the adaptation of the filter coefficients which would occur if short periodic signals were detected based on the histogram. Additionally, the evaluation time is preferably larger than the inverse of the low end cut off frequency of the voice signal. Once the evaluation time is chosen, the hysteresis time is selected to ensure that the periodic signal has dropped out of the register.

The amplitude limits are allowed to adapt over time based on the incoming communication signal. This adaptation of the amplitude limits allows a voice or periodic signal to be detected sooner than conventional methods resulting in better convergence of the filter coefficients. Additionally, a high end cut off limit and low end cut off limit may be defined to remove noise from the incoming communication signal. Any sampled values of the signal that are above or below these cut off limits are not considered in the histogram.

The filter coefficients of the adaptive filter should only be adapted when the fixed time frame register is filled with a voice signal. Therefore, a hysteresis time is chosen long enough such that no periodic signal is present in the fixed time frame register but short enough to avoid freezing the filter coefficients too long.

The present invention is not only important for echo canceling, but for any kind of voice processing device. For example, some devices utilize voice breaks in telecommunication to transmit other data. Applying a hysteresis time between these breaks may help in reducing or avoiding collisions when sharing a single channel for multiple concurrent data transmissions.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENTS

Figure 2:
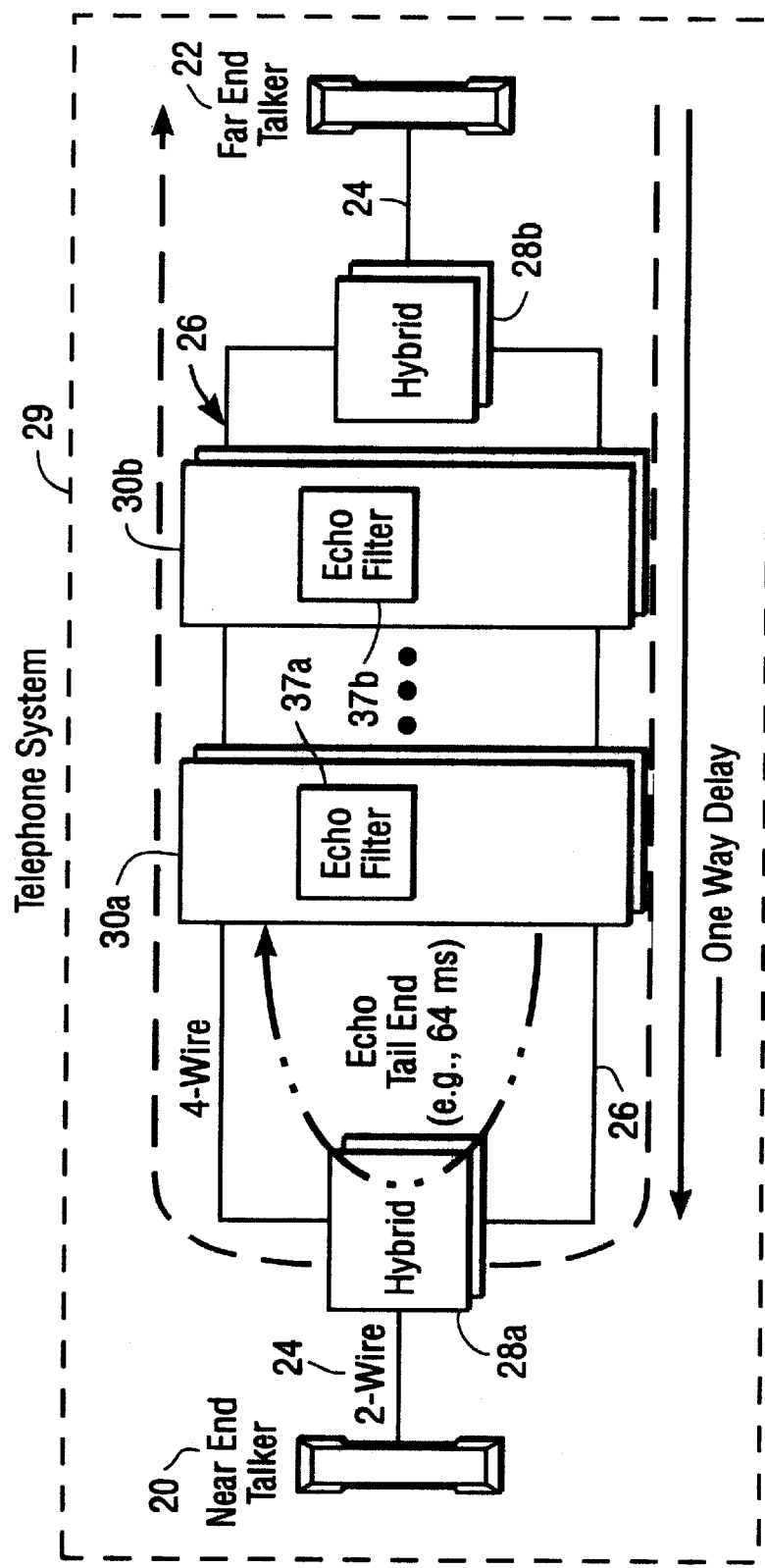
FIG. 2 is a simplified schematic block diagram of a typical two-speaker telephone system that goes through hybrids and integrates an echo canceler.

FIG. 2 and the following discussion are intended to provide a brief, general description of a suitable environment in which the invention may be implemented. While the invention will be described in the general context of a PBX environment, those of ordinary skill in the art will recognize that the-invention may also be implemented in a number of different environments, such as: wireless communication systems; voice over IP systems; Synchronous Digital Hierarchy (SDH) networks; Plesiochronous Digital Hierarchy (PDH) networks; Asynchronous Transfer Mode (ATM) networks; or the like.

FIG. 2 displays a phone system that connects a near end talker to a far end talker. A phone, displayed on the far left hand side of the diagram, represents a near-end talker 20. A second phone, displayed on the far right hand side of the diagram, represents a far end talker 22. Both the near end talker 20 and the far-end talker 22 are connected to similar two wire lines 24. Each two wire line 24 is connected to similar hybrids. Hybrid 28a is located by the near end talker 20 and hybrid 28b is located by the far end talker 22. Each of the hybrids 28a and 28b convert a four wire line 26 into a two wire line 24, as well as a two wire line 24 into a four wire line 26. The hybrids 28a and 28b may cause an electrical echo to occur in the communication line due to hybrid splits caused by the conversion of the four wire line 26 to the two wire line 24. Each of the hybrids 28a, 28b are connected to an echo canceler 30a, 30b that include adaptive filters 32 to remove an echo in a telephone signal.

As the far end talker 22 speaks into the telephone, a voice signal is generated that travels through a two wire system 24 into a hybrid 28b located closest to the far end talker 22. From the hybrid 28b, the voice signal travels into an echo canceler 30b located closest to the far end talker. From the echo canceler 30b the voice signal enters the echo canceler 30a located closest to the near end talker 20 and into the hybrid 28a where the four wire line 26 is converted into the two wire line 24 before being received by the near end talker 20. If the total round trip delay of the voice signal from the far end talker 22 to the near end talker 20 is greater than fifty (50) milliseconds the echo in the line will be noticeable and will disturb the quality of transmission to the user. Therefore, the echo canceler 30a operates to filter out any portion of the far end talker's voice that is reflected back from the hybrid 28a. Similarly, the echo canceler 30b operates to filter any of the near end talker's voice that is reflected from the hybrid 28b.

Figure 3:
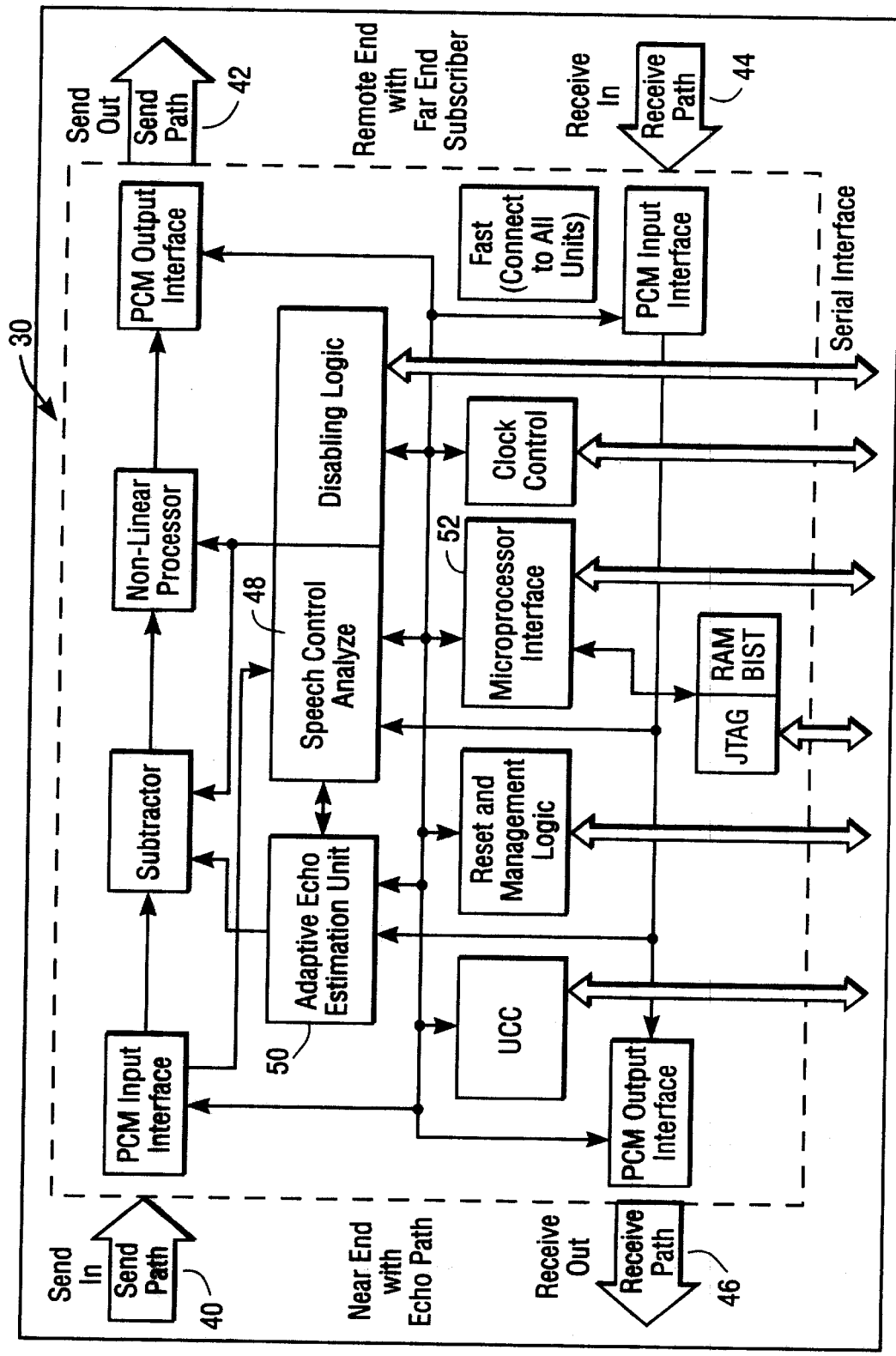
FIG. 3 is a functional block diagram of an echo canceler that implements the present invention.

FIG. 3 displays a functional block diagram of the echo canceler 30. The echo canceler has two inputs and two outputs located on opposing ends of the echo canceler 30. The echo canceler 30 has a send in path 40 and a receive out path 46 located on the left hand side, and a send out path 46 and a receive in path 44 located on the right hand side. The send in path 40 and send out path 42 are located above the receive out path 46 and the receive in path 44.

As a voice signal travels through the receive in path 44 of the echo canceler 30, a speech control unit 48 is activated. Once the speech control unit 48 is activated, the speech control unit 48 activates an adaptive filter 50. The adaptive filter 50 is electronically connected to the speech control unit 48, as well as being electronically connected to the receive in path 44 of the echo canceler 30. If a double-talk condition (i.e., both near end and far end speaking at the same time) is detected, or a no-voice signal with an adequate echo loss enhancement, is identified by the speech control unit 48, the filter coefficients of the adaptive filter 50 are frozen. Under specific circumstances, a reset of the filter coefficients of the adaptive filter 50 might be necessary. For example, if an erroneous signal was detected as a voice signal thereby allowing the filter coefficients to become corrupted. This reset signal is also provided by the speech control unit 48. The adaptive filter 50 is connected to a microprocessor interface 52 in order to configure parameters of the filtering algorithm adaptive filter coefficients.

The echo canceler 30 operates to remove echo signals by sampling the voice signals on the receive in path 44 and subtracting the sampled and digitally filtered signals from the signals in the send out path 42. The amount of signal subtracted is controlled by the adaptive filter 50.

As indicated above, the coefficients of the adaptive filter can diverge from their optimal value if the coefficient adaptation algorithm is given periodic signal data. Therefore, the present invention operates to quickly differentiate voice signals from periodic signals so that coefficient adaptation is halted when period signals are being transmitted or otherwise present on the line.

Figure 4:
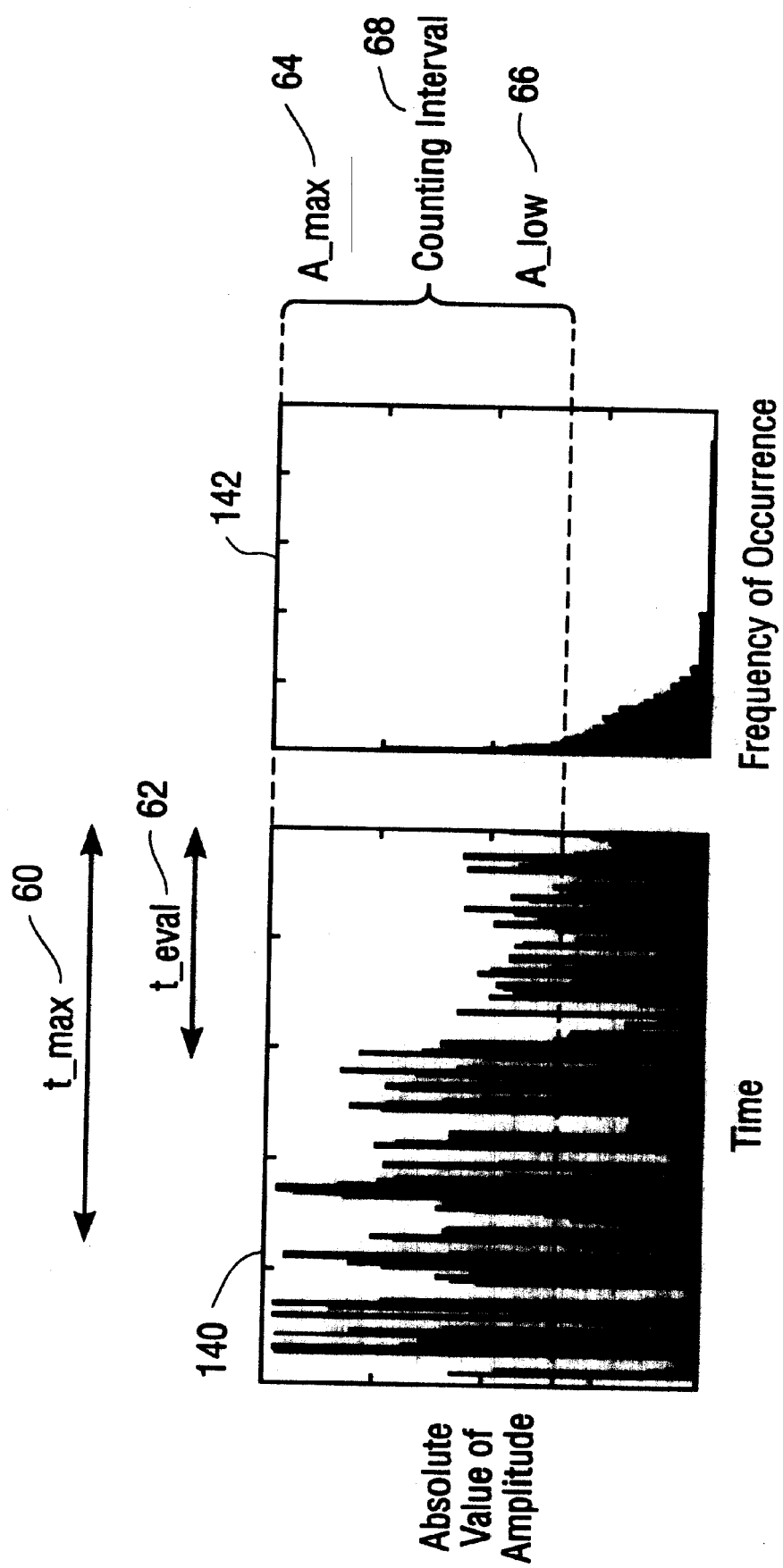
FIG. 4 is a graph of the absolute values of amplitude over time of a typical voice signal and a corresponding histogram.

In order to detect whether a signal applied to an echo canceler is a voice signal or a no-voice or period signal, a histogram of the signal amplitude value is created. FIG. 4 displays a graph 140 of the absolute value of amplitude over time of a typical voice signal. A variable t_max 60 represents the amount of time used in determining the maximum amplitude limit of the signal that is later used as an upper limit in a histogram of the amplitude of the signals that will be described below. In one embodiment of the invention, t_max is typically set to a period of 64 milliseconds which has been found to normally be a sufficient duration of time to determine any anomalies in the signal present at that time. There is no requirement, however, that t_max be set to this period of time. It has been observed that a short period of time for t_max would be 20–40 milliseconds, while a long period of time for t_max would be approximately 120 milliseconds. It will be appreciated by those of ordinary skill in the art that this number could change based on the current signal.

An evaluation time, t_eval 62, is used to determine the amplitude distribution counting time. In one embodiment of the invention, t_eval is 64 milliseconds. In 64 milliseconds, approximately 500 samples of the voice signal could be accumulated that is sampled at a rate of 8000 samples per second. The evaluation time, t_eval, may be chosen independently of t_max 60 described above. A short t_eval 62 time has been found to be 20 milliseconds, or 160 samples, while a long t_eval 62 time has been found to be 120 milliseconds, or 960 samples.

A corresponding amplitude distribution function, or histogram 142, is also displayed. A maximum amplitude variable, A_max 64, defines the upper limit for the amplitude of the voice signal. A separate upper limit may be set such that no extremely high signals or noise is present, such as clicking, in the histogram. The maximum amplitude, A_max 64, changes over time depending on the signal and the evaluation time, t_eval 62, that is chosen. A lower amplitude limit, A_low 66, is also set. A counting interval 68 is defined by the bounds of the lower amplitude limit, A_low 66, and the maximum amplitude limit, A_max 64.

The histogram 142 is formed from the signal received during a predetermined evaluation time, t_eval 62. The evaluation time, t_eval 62, is chosen short enough such that the histogram 142 can react quickly to periodic signals, but large enough to avoid frequently halting the adaptation of the filter coefficients which would occur if short periodic signals were detected based on the histogram. By choosing the histogram evaluation time, t_eval 62, relatively short, the adaptation of the filter coefficients will be halted very quickly after a periodic signal is applied to the voice detection. Hence, t_eval 62 should be larger than the inverse of the low end cut off frequency of the voice signal. Once the evaluation time, t_eval 62, has been chosen and the histogram 142 created, the amplitudes within the counting interval 68 are counted. Periodic signals are detected by the presence of a relatively large number of high amplitude values in a given period of time. Therefore, if a certain, configurable percentage of these sampled values fall within the counting interval 68, then a periodic, or no-voice signal, is detected by the system. Otherwise the signal is recognized as a voice signal. In one embodiment of the present invention, if 500 samples are taken during the evaluation time, t_eval 62, and 300 are within the counting interval, then the signal is detected as periodic, otherwise the signal is detected as a voice signal. As can be seen from the histogram 142, the majority of the sampled values fall outside of the counting interval 68, indicating that the signal being sampled during the evaluation time t_eval 62 is a voice signal.

Figure 5:
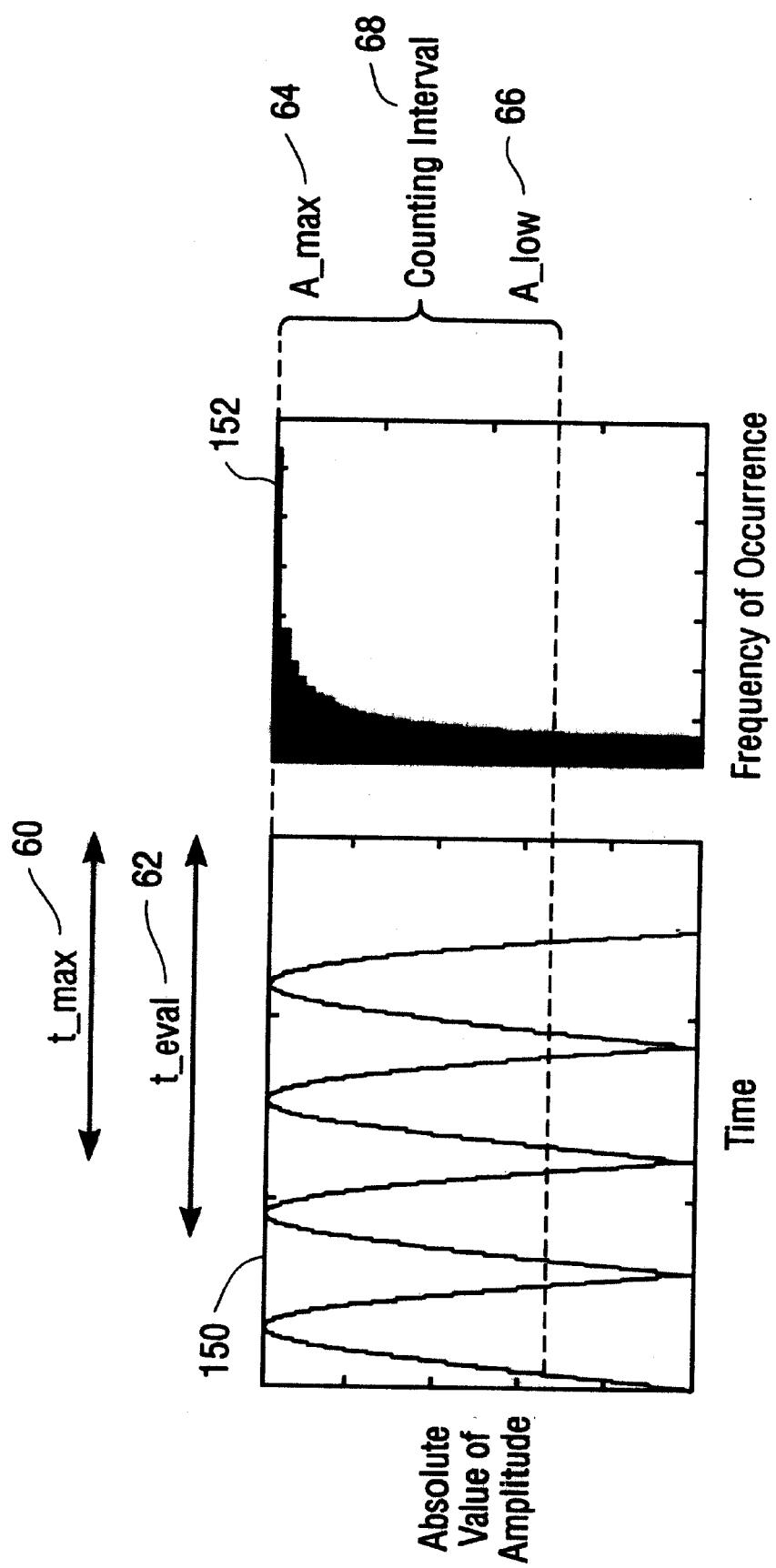
FIG. 5 is a graph of the absolute values of a periodic signal over time and a corresponding histogram.

FIG. 5 displays a graph 152 of the absolute value of amplitude of a periodic signal over time. The graph 152 in FIG. 5 is similar to that of the graph 142 in FIG. 4 and is used to indicate detection of a periodic signal. As described above, a time to determine the maximum amplitude of the signal, t_max 60 is chosen. As can be seen from FIG. 5, the t_max chosen in this example is shorter than the t_max chosen in FIG. 4. The evaluation time, t_eval 62, as described above, is also shown. Periodic signals will have most of their amplitudes close to their maximum amplitude whereas voice signals are characterized by an accumulation of smaller amplitudes.

A corresponding amplitude distribution function, or histogram 152, of the signal shown in graph 152 is also shown in FIG. 5. As can be seen from comparing the histogram 142 of FIG. 4 with histogram 152, a periodic signal contains many more samples within the counting interval 68 than a typical voice signal. When the number of samples in the counting interval is above a configurable percentage, a periodic signal is detected indicating that the adaptive filter coefficients of the echo canceler should not be allowed to changed during the presence of a periodic signal.

Figure 6:
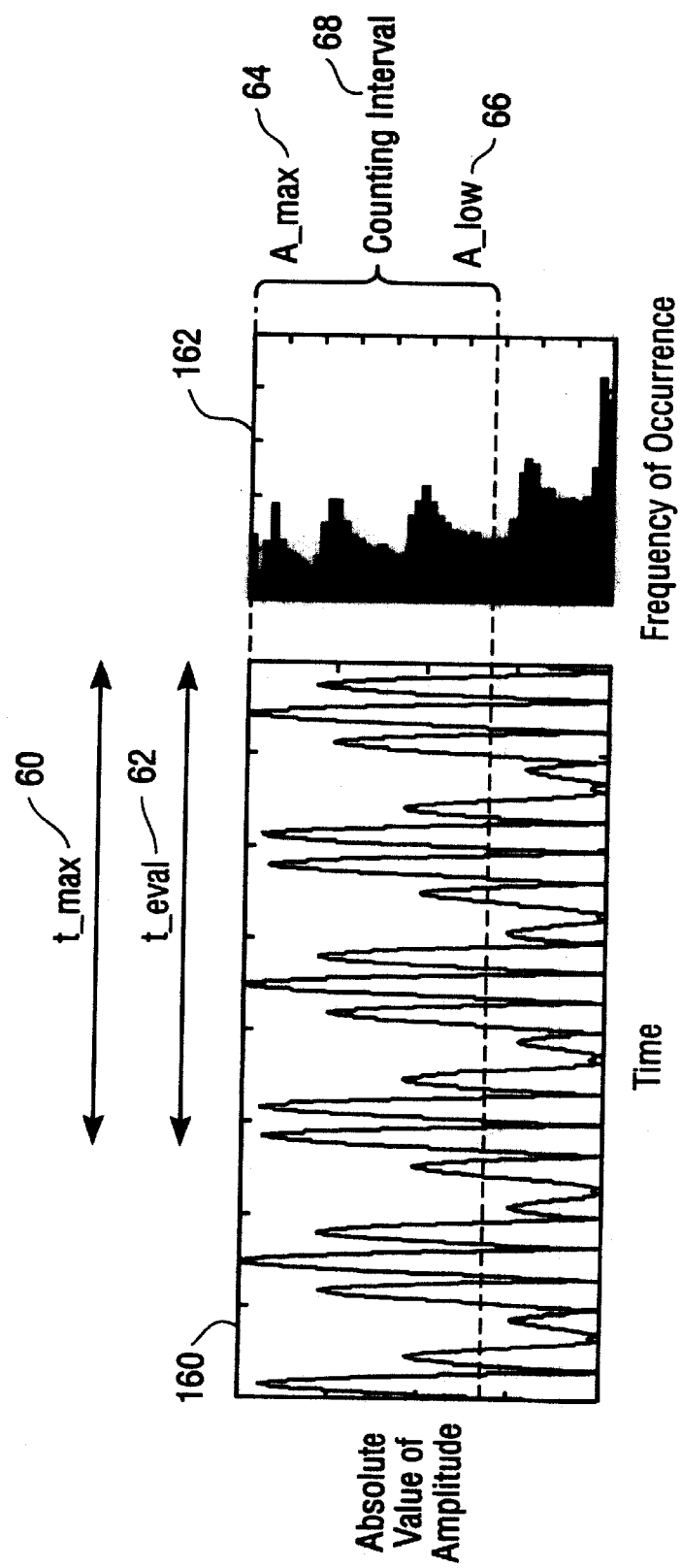
FIG. 6 is a graph of the absolute values of a DTMF tone over time and a corresponding histogram.

FIG. 6 shows the graph of the absolute value of a dual tone multiple frequency (DTMF) tone over time. This periodic signal is typical when a user pushes a key on their push-button telephone. Histogram 162 is the corresponding amplitude distribution function of the signal shown in graph 160. This histogram 162 is a superposition of histograms of sinusoidal signals of different amplitudes. By comparing the histogram 152 of FIG. 5 with histogram 162 of FIG. 6 it becomes apparent that DTMF signals have comparatively more small amplitude samples than large even though a DTMF signal is periodic. Therefore, the counting interval 68 should be chosen carefully to ensure that a DTMF tone is detected as a periodic signal. In one embodiment of the invention, the lower amplitude limit, A_low 66, is 65% below the maximum amplitude limit, A_max 64, or stated differently, A_low 66 is 35% of A_max 64. If A_low 66 is set too high, a DTMF signal will not be detected as a periodic signal. If A_low 66 is set too low, while this signal may be detected as a periodic signal, the speech control unit 48 displayed in FIG. 3, may improperly detect other signals as periodic that are not.

Figure 7:
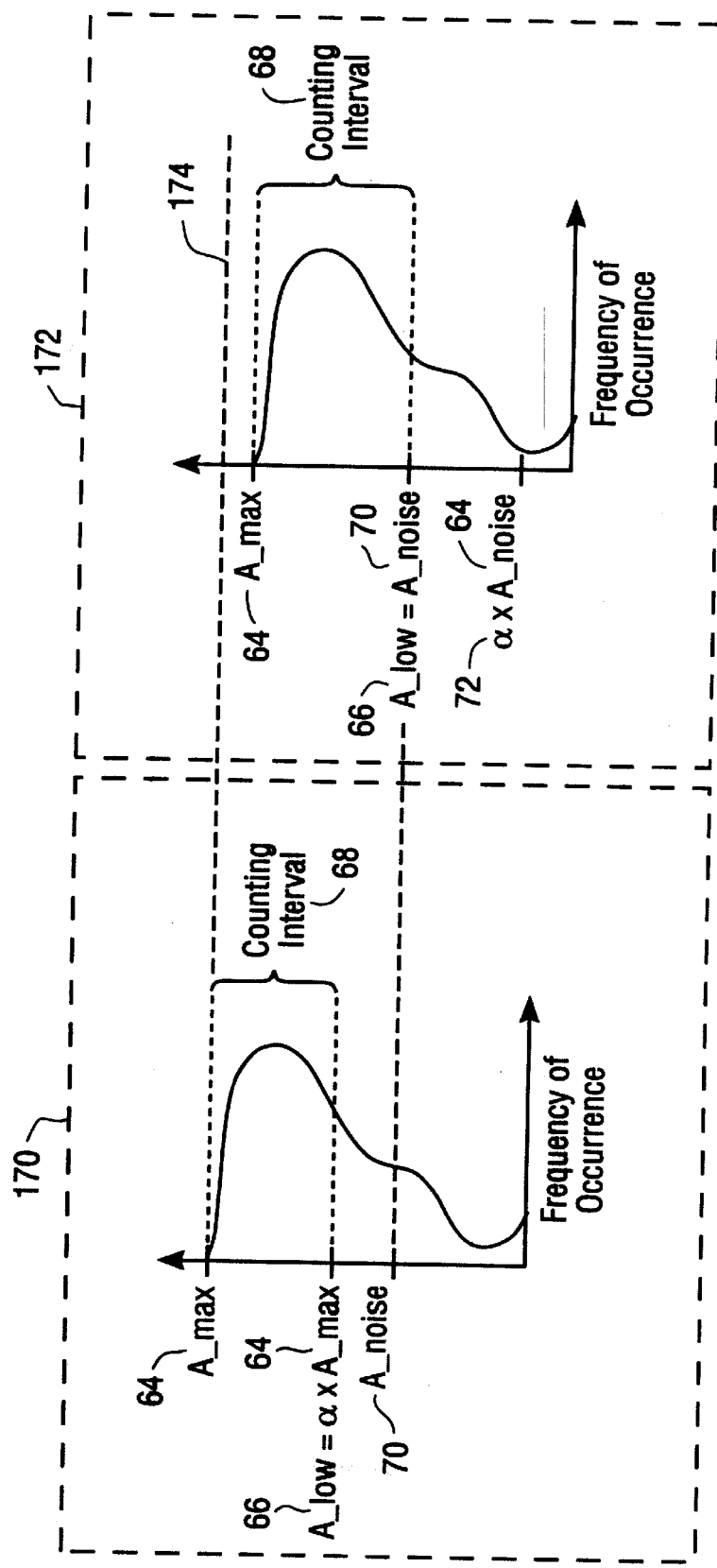
FIG. 7 displays a variable boundary system used for voice detection in accordance with a currently preferred embodiment of the present invention.

FIG. 7 further explains how the boundaries of the counting interval 68 are set for voice detection. A first boundary example 170 is displayed to the left of a second boundary example 172. As described above, if a certain configurable percentage of sampled values falls within the counting interval 68, then the signal is detected as periodic. As long as the signal is detected as periodic the filter coefficients of the echo canceler will not be adapted. An upper limit (not shown) is set such that extremely high values that might arise from noise or other kind of disturbing effects, such as clicking, are suppressed. Values in the signal that are above this limit are ignored for determining the maximum amplitude A_max 64, and are not counted within the counting interval 68. As described above, the lower amplitude limit, A_low 66, is determined by setting it to a percentage of the maximum amplitude limit, A_max 64. In other words, A_low 66 is equal to some percentage, $\alpha$, times the maximum amplitude limit, A_max 64. In one embodiment of the present invention, $\alpha$ is typically 35% of A_max, or 0.35. This percentage of the maximum amplitude limit, A_max 64, $\alpha$ is a constant in the presently preferred embodiment of the invention. It will be appreciated by those of ordinary skill in the art that $\alpha$ could be a variable that could change based on the type of signal being received at any given time. At low voice levels the lower amplitude limit, A_low 66, may fall in an amplitude regime where it can hardly be distinguished from background noise. This situation should be avoided since the background noise could harm the typical voice or no voice histogram. A certain configurable lower noise limit, A_noise 70, is set that defines the absolute minimum value for the interval.

In the second boundary example 172, A_max 64 is less than that shown in boundary example 170 as indicated by the dashed horizontal line 174. As described above, A_max 64 is allowed to change over time based on the signal at a given time and the evaluation time, t_eval 62, that has been chosen. In this example, since the maximum amplitude limit, A_max 64, is lower than in boundary example 170, the value for the lower amplitude limit, A_low 66, or $\alpha$ multiplied by the value of the maximum amplitude limit, A_max 64 will be lower than the predetermined noise limit, A_noise 70, which is the absolute lowest the minimum amplitude, A_low 66, may be set. Whenever this calculation indicates that A_low 66 should be lower than A_noise 70, the minimum amplitude limit, A_low 66 is set such that A_low 66 equals the value of A_noise 70. This helps to ensure that no background noise will harm the typical voice or no voice histogram.

Figure 1:
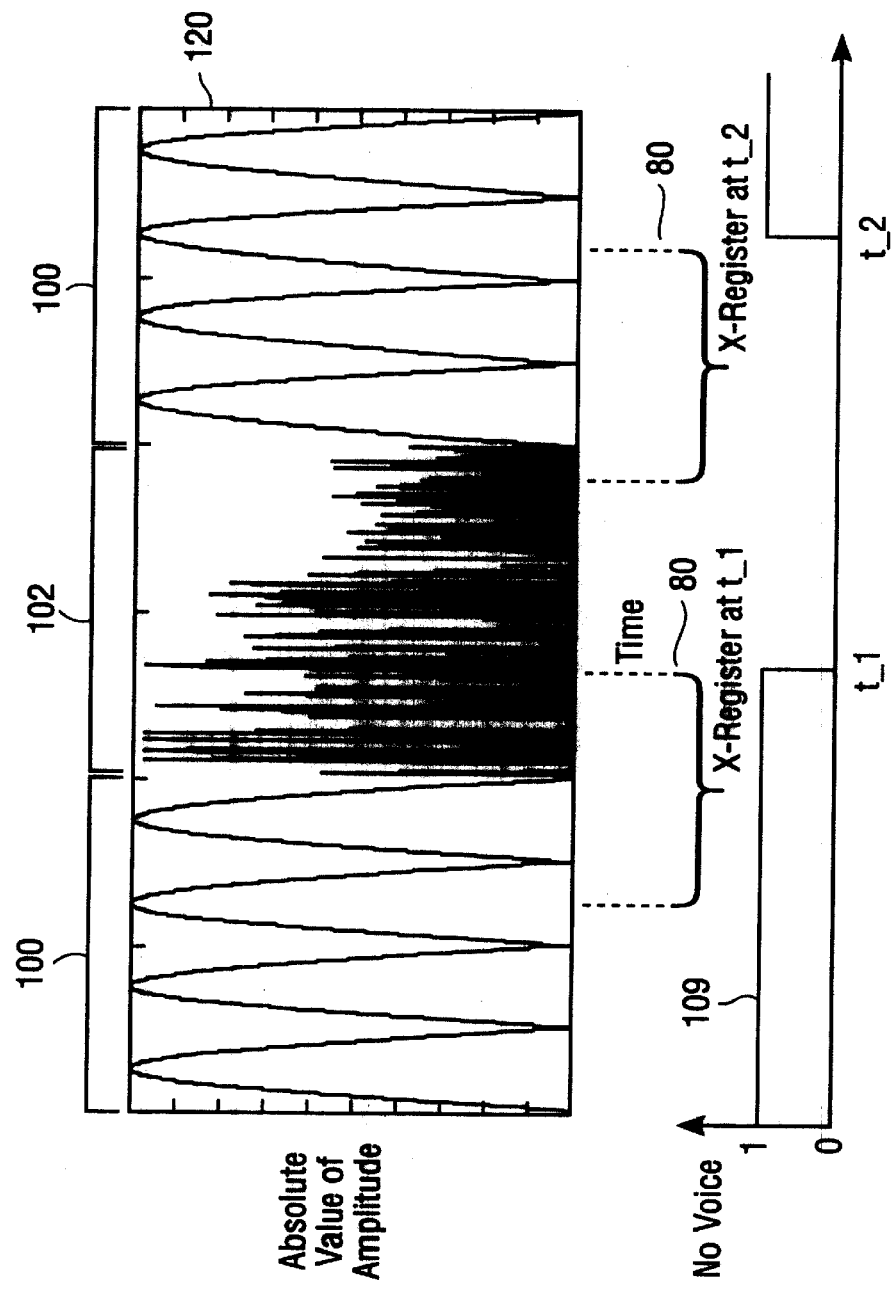
FIG. 1 illustrates how conventional adaptive echo canceler detects the presence of a voice signal.
Figure 8:
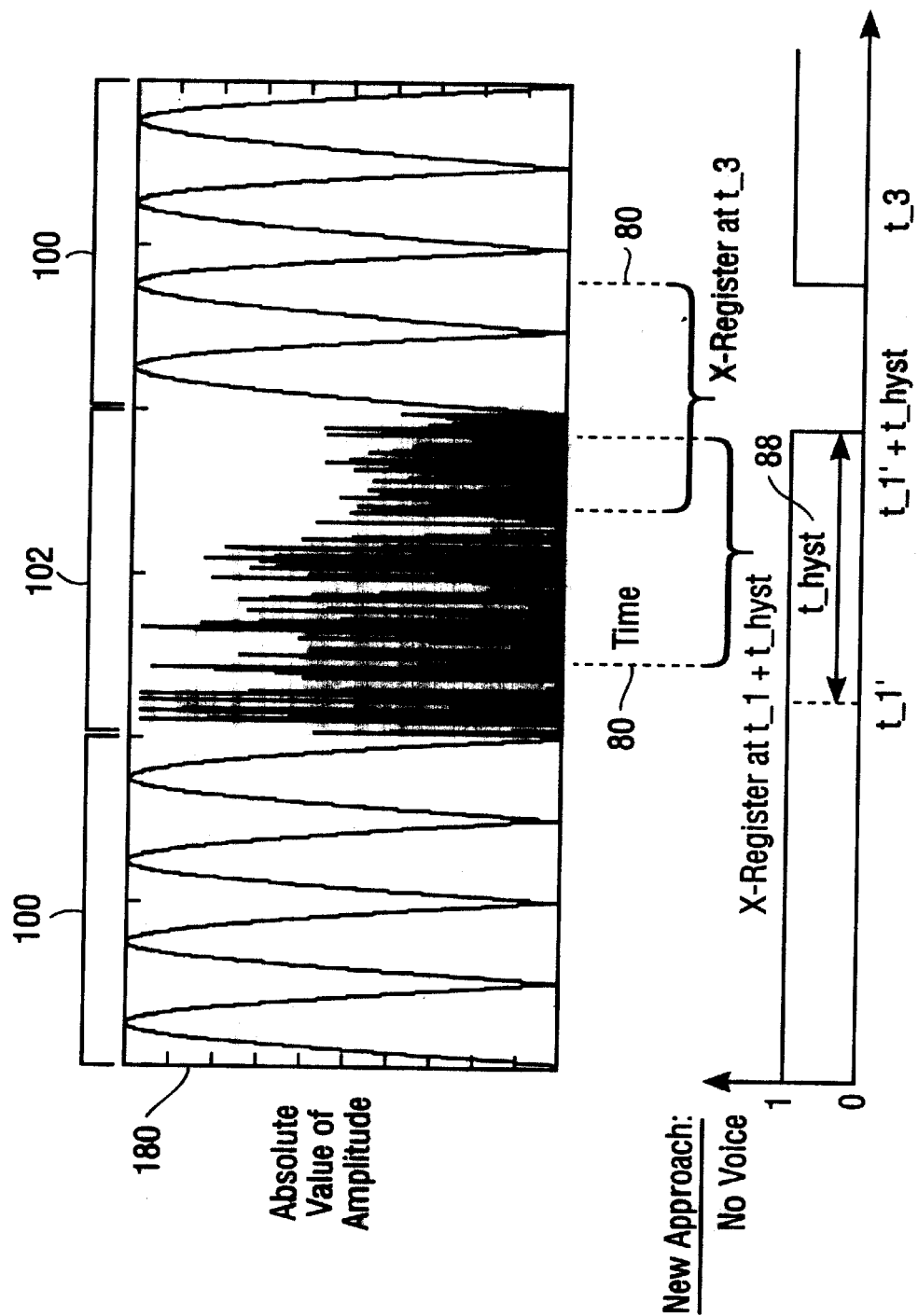
FIG. 8 illustrates the detection of a voice signal in accordance with the preferred embodiment of the present invention.

FIG. 8 illustrates the time at which one embodiment of the present invention detects a voice signal or periodic signal. A graph 180 of a periodic signal and a voice signal is displayed. In the graph 180, a voice signal 102 is centered between two sinusoidal periodic signals 100. A sliding evaluation window, X-register 80, as described above, holds samples of a portion of the signal at any given time. If one compares FIG. 8 with FIG. 1, it can be seen that the present invention detects a voice signal earlier than the prior art approaches due to the configurable properties of the evaluation times and adjustable maximum and lower amplitude limits as described in more detail above. In the present invention a voice signal is detected at time t_1' based on the appropriate setting of the t_eval, A_low, and A_max variables. At t_1', however, the filter is not allowed to adapt the coefficients. Instead, a hysteresis time, t_hyst, delays the adaptation of the coefficients until the hysteresis time lapses. This hysteresis time allows the X-register 80 to be filled with only voice signal. One embodiment of the present inventions provides for the hysteresis time, t_hyst, to be configurable. The hysteresis time, t_hyst, should be chosen carefully such that no periodic signal is present in the X-register 80 when adaptation begins. If t_hyst 88 is chosen correctly, then there will only be voice signal present in the X register. This configuration guarantees stable and monotonous but slow convergence. The filter adaptation should be effectively disabled not only as long as a predominantly periodic signal is applied, but also as long as it is present in the delay path. The amount periodic signal stored in the X-register 80 should be limited to prevent the canceler coefficients from diverging. In one embodiment of the present invention, the freezing of the filter coefficients remain valid from time t_1' until t_1'+t_hyst 88 is reached. Once this time is reached, the X-register 80 should only contain a voice signal. Hence, divergence of the filter coefficients is avoided. If the hysteresis time, t_hyst 88, is incorrectly set, the filter coefficients may be frozen too long. Excessive freezing of the filter coefficients results in low convergence of the coefficients. This hysteresis time also ensures that no overcompensation occurs.

In the example shown in FIG. 8, a no-voice signal is detected at time t_3. By comparing FIG. 8 with FIG. 1 it can be seen that time t_3 is prior to the time $t_{-2}$ displayed in FIG. 1. Also, at time t_3, the X-register 80 contains less of the periodic signal than the X-register 80 contained at time t_2 in the prior art approach. This effect is achieved via programmable counting times and counting intervals.

Figure 9:
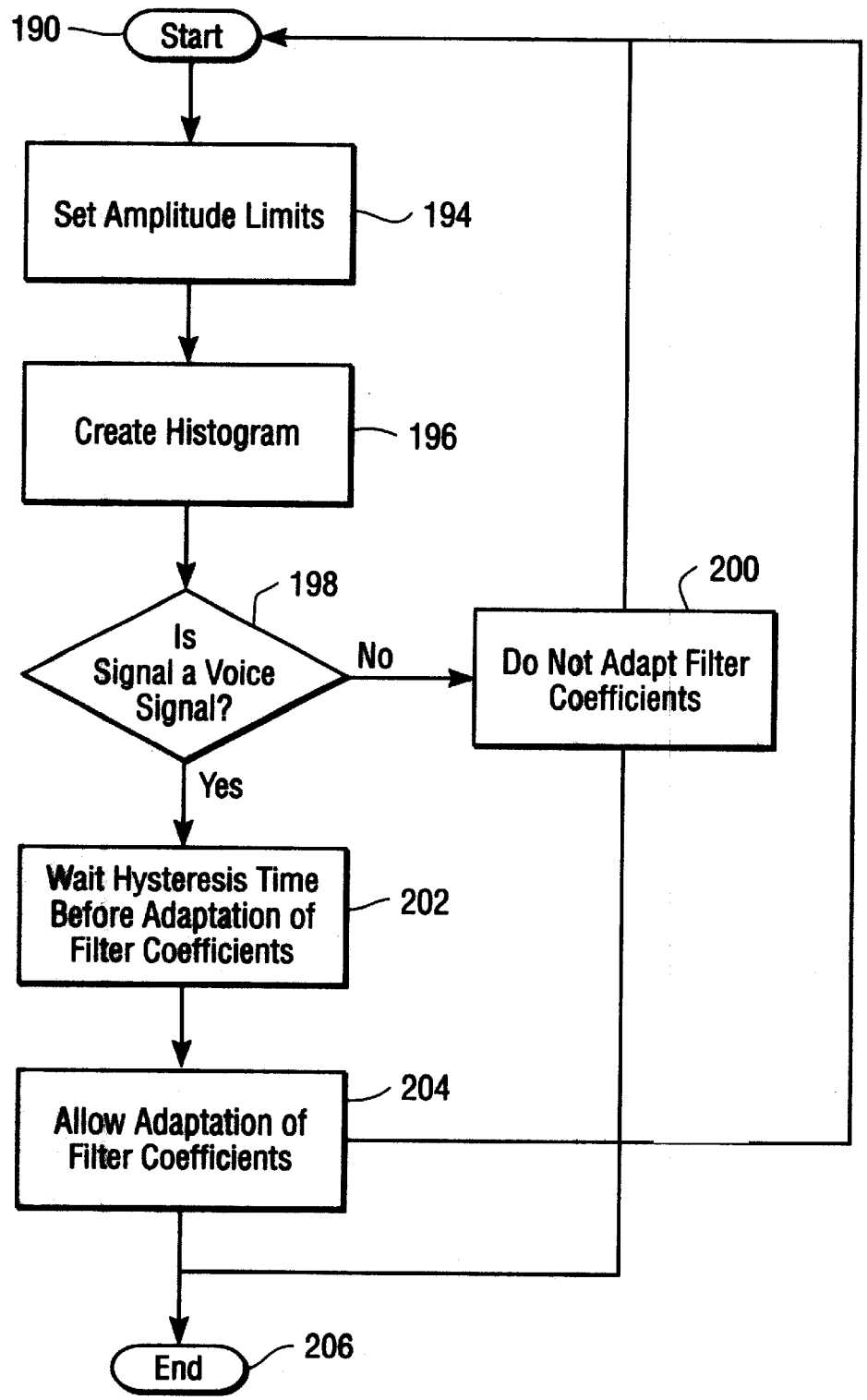
FIG. 9 is a flow diagram illustrating the process of detecting a voice signal and adapting filter coefficients according to the preferred embodiment of the present invention.

FIG. 9 is a flow diagram illustrating the process in one embodiment of the present invention. Starting at step 190 a signal is first received from a receive in path 44 (shown in FIG. 3) of the echo canceler 30. Based on the time to determine the maximum amplitude, t_max 62, and the evaluation time, t_eval 62 (described above and shown in FIG. 4), the maximum amplitude limit, A_max 64, and the minimum amplitude limit, A_low 66 are set in step 194, as described above. A histogram of the signal is then created in step 196, which is the length of the evaluation time, t_eval 62. As described above, based on the counts of the values within the counting interval 68 a determination is made as to whether a voice signal has been detected at step 198. If a voice signal has not been detected then the filter coefficients are not adapted, as shown by step 200 and the signal is sent out of the echo canceler on the receive out path 46 (shown in FIG. 3) indicated by the end step 206. In addition to freezing the coefficients if a voice signal has not been detected, the process starting at step 190 is repeated until no signal is received. If a voice signal has been detected, the process moves to step 202 where a period of time, t_hyst (as shown in FIG. 8), is waited before allowing the filter coefficients in the adaptive filter to adapt. Once the t_hyst time has been exhausted the filter coefficients are allowed to adapt at step 204. As long as a signal is received from the receive in path 44 blocks the process starting with step 190 is repeated. Once there is no signal the process ends at step 206.

Figure 10:
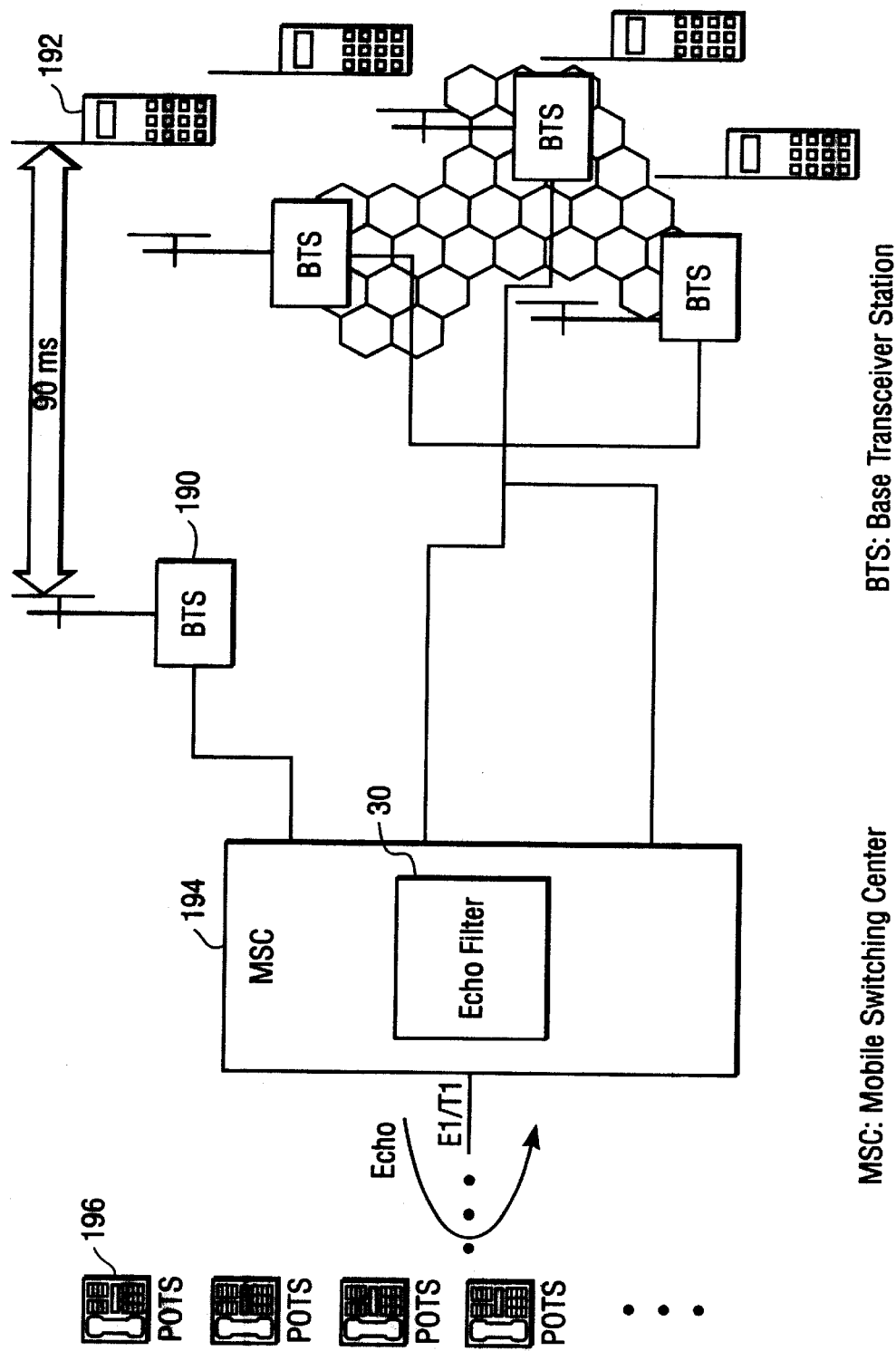
FIG. 10 is a block diagram showing the echo canceler of the present invention in a wireless system.

FIG. 10 displays the present invention used in a wireless system. The use of echo cancelers in wireless systems is desirable due to the long delay times introduced. For example, in the system shown in FIG. 10, there is a delay time of 90 milliseconds from the mobile telephone to the base transceiver station 190. The return signal therefore will not reach the mobile telephone 192 for at least 180 milliseconds. The base transceiver station 190 which receives the wireless communication from the mobile telephone 192 is connected to a mobile switching center 194, which contains the echo canceler unit 30. The mobile switching center 194 is connected to the individual telephone 196 similar to the system shown in FIG. 2.

Figure 11:
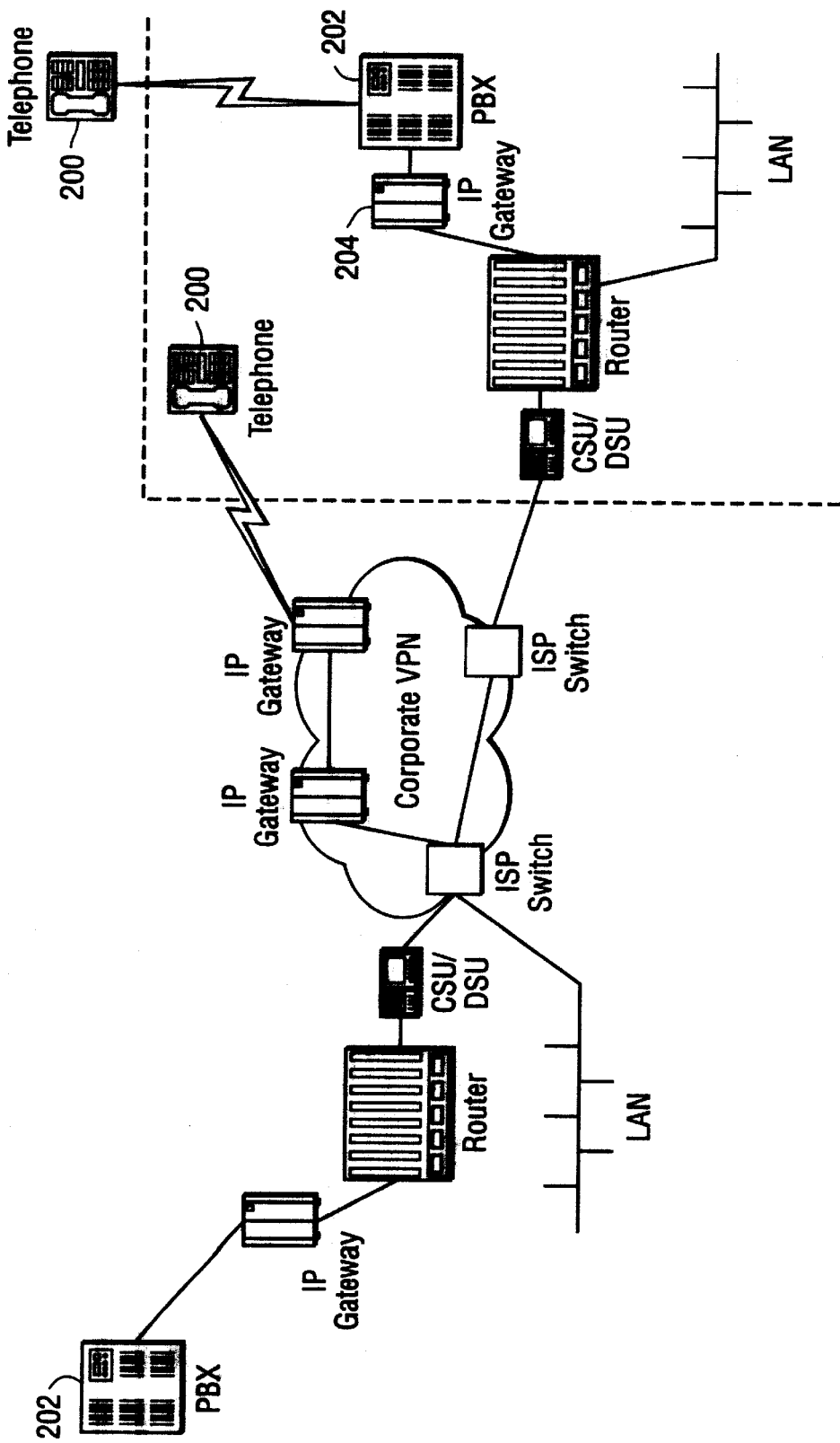
FIG. 11 is a block diagram showing the echo canceler of the present invention in a voice over IP application.

FIG. 11 shows the use of the echo canceler of the present invention in a voice-over IP application. The echo canceler can be widely used to reduce acoustic and electrical echo in voice-over IP circuits. As in wireless systems, voice-over IP circuits tend to have very large delay times associated with them. Typical systems have 200 to 400 millisecond round trip delays.

Figure 12:
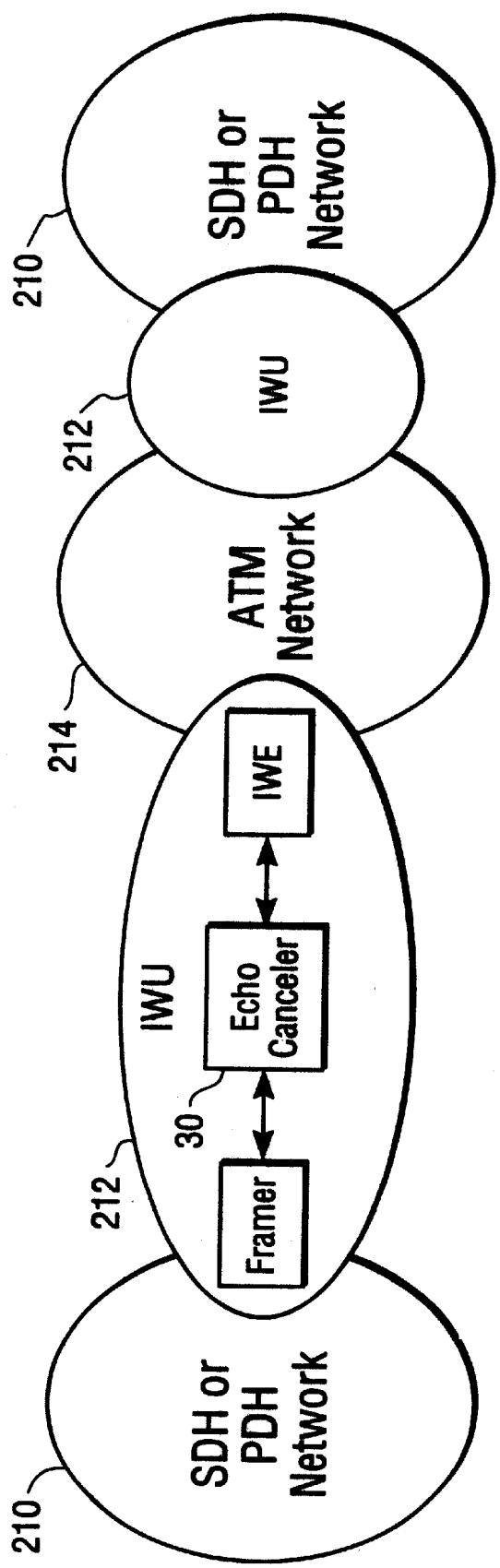
FIG. 12 is a block diagram showing the echo canceler of the present invention in an ATM network.

FIG. 12 shows the echo canceler in a circuit emulation service. An internetworking unit 212 connects different networks together. The internetworking unit contains the echo canceler (as shown in FIG. 3) to remove echo created by the delay times between the various networks. A Synchronous Digital Hierarchy Network or Plesiochronous Digital Hierarchy Network 210 is connected the internetworking unit 212 which is connected to an Asynchronous Transfer Mode Network 214.

What is claimed is:

1. A method of detecting whether an incoming communication signal is a voice signal or a periodic signal, comprising the steps of:
   (a) setting a configurable maximum amplitude limit;
   (b) setting a configurable lower amplitude limit such that a counting interval is defined by the range of values that are contained between the lower amplitude limit and the maximum amplitude limit;
   (c) setting a configurable evaluation time to sample the incoming communication signal;
   (d) sampling the incoming communication signal during the evaluation time;
   (e) determining a count of the number of samples having a value within the counting interval;
   (f) arriving at a determination of whether the incoming communication signal is a voice signal or a periodic signal based on the count.

2. The method of claim 1, wherein setting the configurable maximum amplitude limit comprises setting a configurable maximum amplitude determination time; sampling the incoming communication signal during the maximum amplitude determination time; and setting the configurable maximum amplitude limit based on the incoming communication signal sampled during the maximum amplitude determination time.

3. The method of claim 1, further comprising setting a configurable upper limit that removes samples of the incoming signal that are above a predetermined limit.

4. The method of claim 1, wherein setting the configurable evaluation time comprises determining a low end cutoff frequency of the incoming communication signal and setting the evaluation time larger than the inverse of the low end cutoff frequency of the incoming communication signal.

5. The method of claim 1, wherein setting the configurable lower amplitude limit comprises multiplying the configurable maximum amplitude limit by a configurable constant.

6. The method of claim 1, further comprising setting a configurable noise limit that is greater than background noise level in the incoming communication signal.

7. The method of claim 6, wherein setting the configurable lower amplitude limit comprises:
   computing the lower amplitude limit by multiplying the configurable maximum amplitude limit by a configurable constant; and
   setting the lower amplitude limit equal to the configurable noise limit if the lower amplitude limit is less than the configurable noise limit.

8. The method of claim 1, wherein determining if the incoming communication signal is a voice signal or a periodic signal comprises:
   determining if the count is greater than a predetermined percentage of the total number of samples during the evaluation time; and
   if the count is greater than the predetermined percentage detecting the incoming communication signal as a periodic signal, otherwise detecting the incoming communication signal as a voice signal.

9. The method of claim 1, wherein determining if the incoming communication signal is a voice signal or a periodic signal comprises:
   creating a histogram of the amplitude for the incoming communication signal samples;
   analyzing the histogram to determine if a predetermined percentage of the sample values is within the counting interval; and
   detecting a periodic signal if the predetermined percentage of the sample values is within the counting interval and detecting a voice signal if the predetermined percentage of the total number of samples does not fall within the counting interval.

10. The method of claim 9, wherein setting the predetermined percentage of the sample values comprises setting the predetermined percentage to at least sixty percent of the total number of samples.

11. A method of controlling the adaptation of filter coefficients in an echo canceler, comprising:
   receiving an input signal having a magnitude and including voice signals or periodic signals;
   analyzing the input signal to determine whether a voice signal or a periodic signal is currently being received, wherein analyzing the input signal includes sampling the magnitude of the input signal, creating a histogram of the sampled magnitude, and analyzing the histogram to detect a voice signal or a periodic signal; and
   controlling the adaptation of the filter coefficients of the echo canceler by waiting a predetermined amount of time after a voice signal is detected in the input signal before adapting the filter coefficients.

12. The method of claim 11, wherein analyzing the input signal to determine whether a voice signal or periodic signal is currently being received comprises:
   (a) setting a configurable maximum amplitude limit;
   (b) setting a configurable lower amplitude limit such that a counting interval is defined by the range of values that are contained between the lower amplitude limit and the maximum amplitude limit;
   (c) setting a configurable evaluation time to sample the input signal;
   (d) sampling the input signal during the evaluation time and determining a count of the number of samples, having a value within the counting interval;
   (e) arriving at a determination of whether the input signal includes a voice signal or a periodic signal based on the number of samples of the input signal having a value within the counting interval.

13. The method of claim 12, wherein setting the configurable maximum amplitude limit comprises setting a configurable maximum amplitude determination time; sampling the incoming communication signal during the maximum amplitude determination time; and setting the configurable maximum amplitude limit based on the incoming communication signal sampled during the maximum amplitude determination time.

14. The method of claim 12, further comprising setting a configurable upper limit that removes samples of the incoming signal that are above a predetermined limit.

15. The method of claim 12, wherein the determination of whether the input signal includes a voice signal or a periodic signal comprises:

determining whether the count is greater than a predetermined percentage of the total number of samples during the evaluation time; and if the count is greater than the predetermined percentage detecting that the input signal includes a periodic signal, otherwise detecting that the input signal includes a voice signal.

16. The method of claim 11, wherein the filter coefficients are adapted based on a number of samples of the input signal contained in a shift register, and wherein the adaptation of the filter coefficients is delayed by waiting until the shift register contains substantially no samples of a periodic signal after the detection of a voice signal in the input signal.

17. The method of claim 11, wherein the histogram is analyzed by:

setting a maximum amplitude limit;

setting a lower amplitude limit having a value less than the maximum amplitude limit; and determining whether the number of the sampled input signal having absolute values within a range defined by the maximum amplitude limit and the lower limit exceeds the threshold, and if so, detecting a periodic signal.

18. The method of claim 11, further comprising:

halting the adaptation of the filter coefficients after detecting that a periodic signal is received in the input signal.

* * * * *